G. B. COLLIER.
HEATING APPARATUS.
APPLICATION FILED AUG. 7, 1906.
1,043,508.
Patented Nov. 5, 1912.
2 SHEETS—SHEET 2.
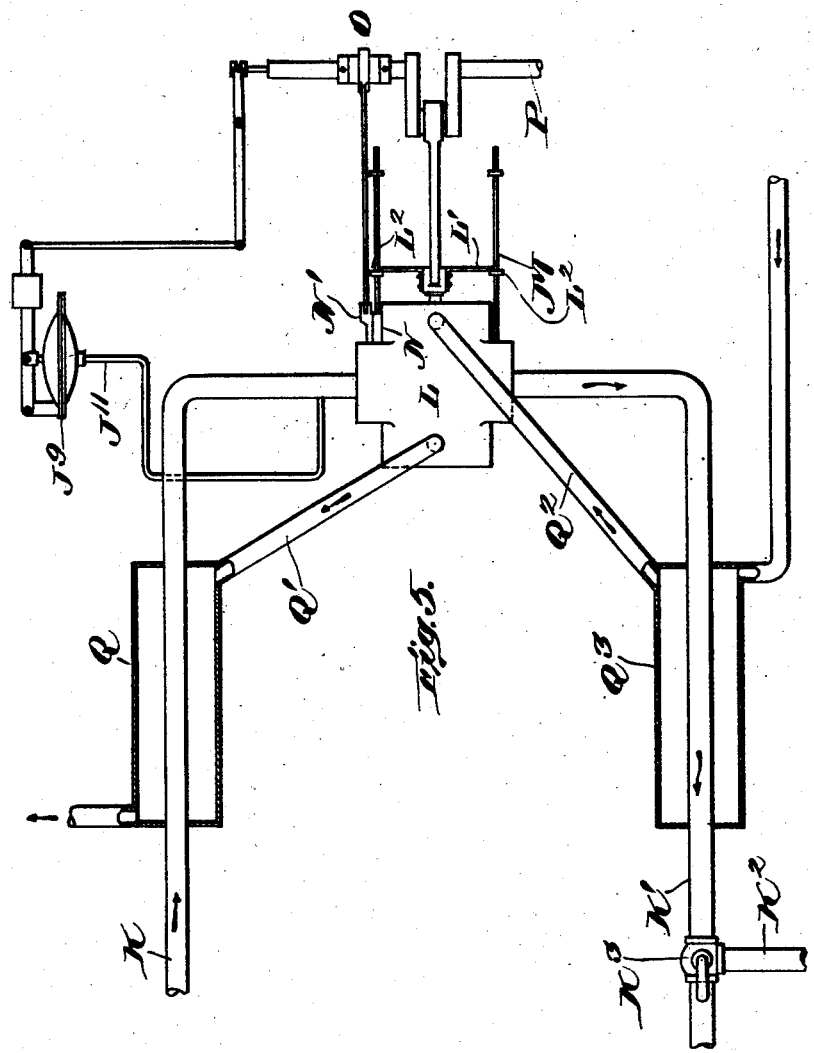

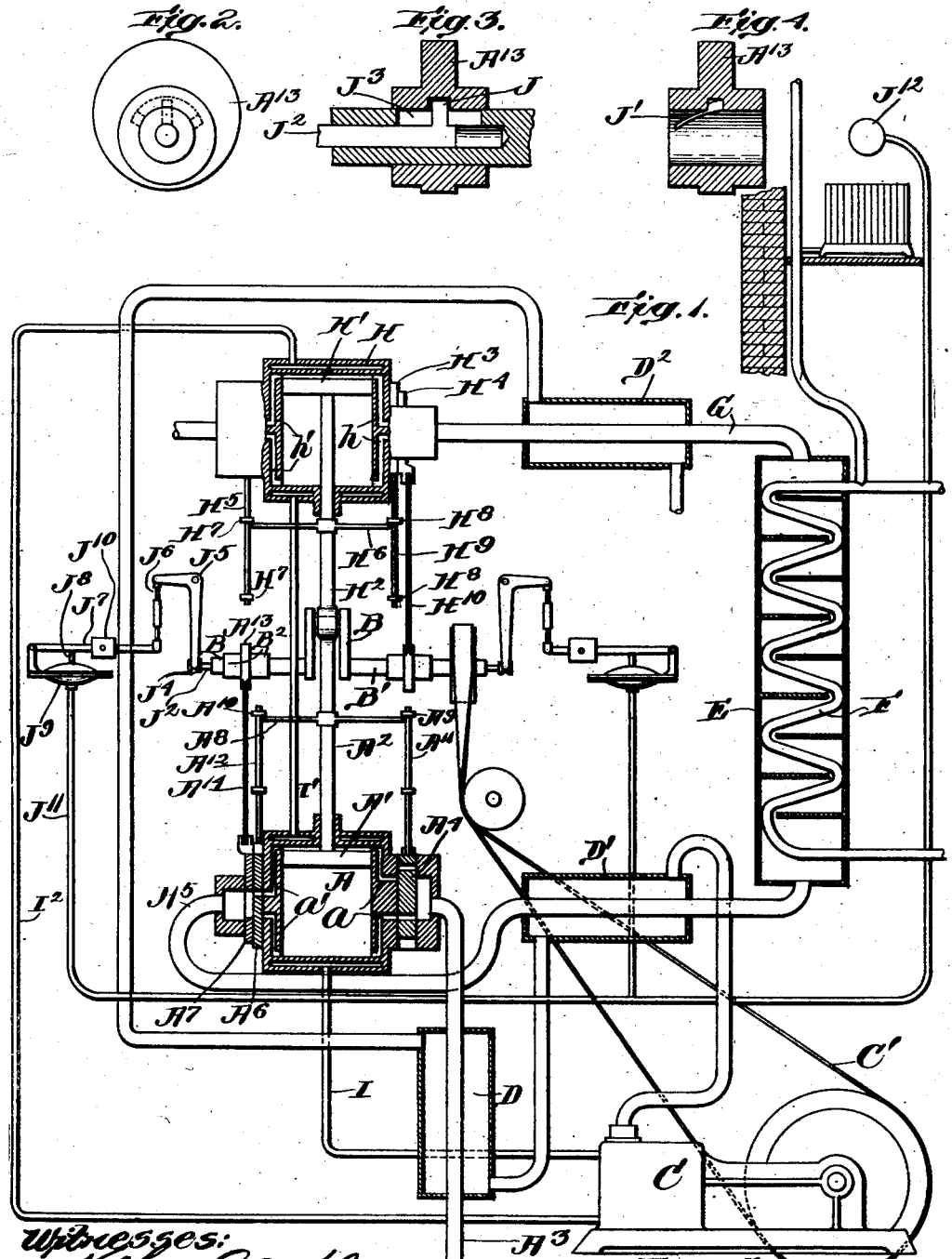

UNITED STATES PATENT OFFICE.

GUY B. COLLIER, OF KINDERHOOK, NEW YORK.

HEATING APPARATUS.

1,043,508. Specification of Letters Patent. Patented Nov. 5, 1912.

Application filed August 7, 1906. Serial No. 329,523.

*To all whom it may concern:*

Be it known that I, GUY B. COLLIER, citizen of the United States, and resident of Kinderhook, Columbia county, New York, have invented certain new and useful Improvements in Heating Apparatus, of which the following is a specification.

The invention relates to a heating apparatus in which the heat conveying or circulating medium is an elastic fluid such as air and in which the temperature of the fluid is raised to the degree required by first expanding the fluid and then compressing it, heat being supplied to the fluid between its admission to the expanding mechanism and its admission to the compressing mechanism so that the heating of the fluid is effected by doing a comparatively small amount of work thereon.

In practising the invention the air or other heat carrying fluid of the system is taken into a compressing mechanism by which it is compressed a predetermined amount and from which it is delivered to a circulating conduit. In compressing the air a certain amount of heat is supplied thereto by reason of the work done upon it and the heat already in the air is also raised to a higher temperature level. The compressed air with its high temperature heat is then passed through the circulating conduit where it may be utilized for heating purposes either by passing it through the radiators or piping of a heating system or by passing it through a device for heating the water of a hot water circulating system or in any other desired manner. If found desirable a portion of the air may be utilized for ventilating purposes. The compressed air after passing through the circulating conduit is utilized to assist or supplement the action of the motor which drives the compressing mechanism thereby reducing the power required to operate this mechanism.

The quantity of heat at a temperature suitable for heating purposes which may be obtained by an apparatus having the general mode of operation above outlined, is so great in proportion to the work required for operating purposes that the apparatus may be used with economy for heating purposes.

The economy of the apparatus may be increased by utilizing the waste heat from the motor used for operating purposes to heat the incoming air on its way to the compressing mechanism and may be further increased by also utilizing the waste heat from the motor in heating the air as it passes through various parts of the apparatus as will be more fully explained later on.

For the purpose of illustration I have shown diagrammatically in the accompanying drawings, two forms of apparatus each of which embodies some or all of the features of my invention.

The various features of the invention will be pointed out in the claims and will be readily understood from the following detailed description of the apparatus indicated in the drawings.

In these drawings—Figure 1 is a diagrammatic view illustrating a system in which a gas or hydrocarbon engine is used as the operating motor and in which the high temperature air passed through the circulating conduit is utilized to heat the water of a hot water heating system. Figs. 2, 3 and 4 are details of parts of the devices shown for regulating and governing the action of the compressing mechanism and of the motor in which the compressed air from the circulating conduit is utilized; and Fig. 5 is a diagrammatic view showing a different form of mechanism for compressing the air and utilizing the compressed air delivered from the circulating conduit.

In the apparatus indicated in Fig. 1 the compressing mechanism is in the form of a cylinder A within which reciprocates a piston A'. The piston is reciprocated by a crank B carried by a shaft B' and connected with the piston rod A². The shaft B' is driven from a gas or hydrocarbon engine indicated at C through a belt C'.

Air is supplied to the compression cylinder through an intake pipe A³ and the admission of the air to either side of the piston is controlled by a valve A⁴ constructed to open and close the intake ports *a* in any suitable or well known manner. The air compressed within the cylinder is delivered through the ports *a'* into a delivery pipe A⁵ which forms a part of or connects with the circulating conduit. The delivery of the air through the ports *a'* is controlled by a main valve A⁶ and a release valve A⁷, these valves being similar in construction to main and cut-off valves such as used in steam engines. The main valve A⁶ and the intake valve A⁴ are shifted at each end of the stroke of the piston by means of arms A⁸ projecting from the piston rod $A^2$ and arranged to operate upon tappets $A^9$ $A^{10}$ carried by the valve rods $A^{11}$ $A^{12}$. The release valve $A^7$ is operated to open communication between the ports $a'$ and the delivery pipe $A^5$ at the proper point in the stroke of the piston in either direction by means of an eccentric $A^{13}$ carried by the shaft B and connected with the valve by an eccentric strap and rod $A^{14}$.

The incoming air as it passes through the intake pipe $A^3$ is heated by a heating device D through which the hot exhaust products from the engine C are circulated. The air passing through the delivery pipe $A^5$ is also subjected to the heating action of the hot exhaust gases from the engine by a heating device $D'$ through which these exhaust gases are led directly from the engine and from which they are delivered to the heating device D.

By the action of the compressing mechanism the heat contained in the air drawn from the atmosphere and also the heat absorbed by the air in passing through the heater D is raised to a higher temperature level and heat is also supplied to the air by reason of the work done thereon in compressing it. The compressed air delivered to the delivery pipe $A^5$ therefore contains a large quantity of comparatively high temperature heat, the temperature of which, other things being equal, will depend upon the amount of compression effected by the compressing mechanism. The temperature of this air is further raised by the absorption of heat as it passes through the heating device $D'$. The compressed air with its high temperature heat passes from the pipe $A^5$ through a drum or chamber E where it acts to heat the water circulating through a coil F forming a part of a hot water heating system.

The compressed air having imparted its high temperature heat to the water circulating through the coil F, is delivered from the circulating conduit formed by the drum E through a pipe G to a motor which assists in driving the compressing piston $A'$. This motor in the apparatus shown consists of a cylinder H within which reciprocates a piston $H'$. The cylinder H is arranged on the opposite side of the crank shaft $B'$ from the cylinder A and the piston $H'$ is connected to the crank B through the piston rod $H^2$ which forms a continuation of the piston rod $A^2$. The supply of compressed air to the cylinder H from the pipe G is controlled by a main valve $H^3$ and a cut-off valve $H^4$, these valves controlling the communication between the pipe G and the supply ports $h$ of the cylinder. The air escapes from the cylinder H through exhaust ports $h'$ which are controlled by a valve connected to the valve rod $H^5$. The main valve $H^3$ and the exhaust valve are shifted at each end of the stroke of the piston by arms $H^6$ connected with the piston rod $H^2$ and engaging collars $H^7$ $H^8$ on the valve rods $H^5$ and $H^9$. The cut-off valve $H^4$ is operated to cut off the supply of compressed air from the pipe G at the proper point in the stroke of the piston in each direction by an eccentric similar to eccentric $A^{13}$ mounted on the shaft $B'$ and connected with the valve by an eccentric strap and rod $H^{10}$.

With the piston H and cylinder $H'$ arranged and connected as described the compressed air delivered from the circulating conduit through the pipe G operates to force the compression piston $A'$ in a direction to effect the compression and thus supplements the action of the engine C in operating the compressing mechanism.

The effective action of the compressed air in the cylinder H may be increased and the economy of the apparatus thereby increased by utilizing the exhaust gases from the engine to heat the air as it passes through the pipe G. For this purpose the apparatus may be provided with a heating device $D^2$ through which the pipe G passes and to which the exhaust gases pass from the heating device D.

The efficiency and economy of the apparatus may be further increased by utilizing the heat contained in the water circulating through the jacket of the combustion cylinder of the engine to heat the air during compression and during its expansion and use in the motor cylinder H. For thus utilizing the heat in this water, the cylinders A, H may be jacketed and the water from the jacket of the engine led through these jackets and returned to the jacket of the cylinder through pipes I, $I'$, $I^2$.

In utilizing the apparatus for supplying heat to be utilized in heating buildings the air should be delivered to the circulating conduit at the proper temperature to secure a substantially even temperature in the apartments which are heated. The range of temperature through which the air should be raised by the compressing mechanism and therefore the amount of compression will vary with the conditions under which the apparatus is used. That is to say, if the outside air is at a low temperature the amount of compression required in order that the air may be delivered by the compressor at the required temperature, will be greater than the amount of compression required if the outside air is at a higher temperature.

In order that the apparatus may be adjusted or regulated to suit the varying conditions under which it may be used, means are provided for varying the compression produced by the compressing mechanism. When the compression is varied the amount of air supplied to the means for utilizing the compressed air as it comes from the circulating conduit should also be varied in conformity therewith and the apparatus is therefore also provided with means for varying the amount of air delivered from the circulating conduit. After the apparatus has been adjusted to suit the existing conditions under which it is to be used, its operation, in case the temperature in the apartments which are to be heated is to be maintained substantially constant, should be so governed that the compression will be increased in case the temperature in the apartment falls and be decreased in case the temperature in the apartment rises. To effect this result the apparatus may be provided with means for governing the compression and for governing the delivery of air from the circulating conduit which is controlled by the temperature in the apartment being heated.

One form of regulating and controlling means suitable for use in connection with the form of compressing mechanism and means for utilizing the compressed air from the circulating conduit shown in the drawings, is that indicated in Figs. 1, 2, 3 and 4.

The amount of compression effected in the compression cylinder depends upon the point in the stroke of the piston at which the release valve $A^7$ acts to open communication between the port $a'$ and the delivery pipe $A^5$ and the point at which the valve so acts depends upon the position of the eccentric $A^{13}$ upon the shaft $B'$. The compression effected in the compression cylinder may therefore be regulated and governed by regulating and governing the position of the eccentric upon the shaft $B'$. For this purpose the eccentric is loosely mounted upon the shaft $B'$ between the collars $B^2$ and is held in position upon the shaft by means of a pin $J$ which engages a spiral groove $J'$ formed in the bore of the eccentric. The pin $J$ is secured upon the end of a rod $J^2$ which is mounted within the shaft $B'$, the pin projecting through a longitudinal slot $J^3$ formed in the shaft. The rod $J^2$ projects beyond the end of the shaft $B'$ and is provided with two collars $J^4$ which engage opposite sides of a pin projecting from one arm of a bellcrank lever $J^5$. The other end of the bellcrank $J^5$ is connected by means of an adjustable link $J^6$ with a lever $J^7$. The lever $J^7$ is connected by a link or pin $J^8$ with a flexible diaphragm within the casing $J^9$ and is provided with an adjustable weight $J^{10}$ by which the pressure transmitted from the lever to the diaphragm may be regulated. The chamber within the casing below the diaphragm is connected by a pipe $J^{11}$ with a thermostat $J^{12}$ arranged within the building which is to be heated and constructed in any usual or wellknown manner to vary the pressure within the pipe $J^{11}$ according to the temperature at the thermostat.

The eccentric for the cut-off valve $H^4$ of the cylinder $H$ is connected with a similar regulating and governing mechanism. By adjusting the weights $J^{10}$ upon the arms $J^7$ the pressure on the diaphragms in the casing $J^9$ may be adjusted to counterbalance the pressure on the under sides of the diaphragms corresponding to the desired temperature at the thermostat. By adjusting the links $J^6$ the release and cut-off valves may be set to regulate the compression and therefore the temperature of the compressed air to suit the conditions under which the apparatus is to operate at any particular time. After the eccentrics have been thus set the thermostat will operate to control the governing mechanisms to maintain a substantially constant temperature at the thermostat. If the temperature at the thermostat falls, the eccentrics will be shifted to cause the release valve to operate at a later point in the stroke of the compression piston $A'$ and to cause the cut-off valve to operate at an earlier point in the stroke of the piston $H'$. This will result in a greater compression of the air and therefore a rise in the temperature of the air passing through the circulating conduit. If the temperature at the thermostat rises, the eccentrics will be operated to cause the release valve to operate earlier in the stroke of the piston $A'$ and the cut-off valve to operate later in the stroke of the piston $H'$. This will result in less compression of the air and consequently a lowering of the temperature of the air in the circulating conduit.

In case it is desired to maintain a constant pressure and temperature in the circulating conduit, the pipes $J^{11}$ which connect with the casings $J^9$ may be connected with the drum $E$, in which case the governing mechanisms will control the release and cut-off valves to maintain a constant pressure and consequently a constant temperature in the circulating conduit. The governing mechanism may be controlled in other ways if found desirable.

In the form of apparatus indicated in Fig. 5 a single cylinder and piston are employed as the compressing mechanism and as the means for utilizing the compressed air delivered from the circulating conduit. In this apparatus the air is taken into the system and is compressed to the desired pressure and then this air is circulated continuously through a closed circuit, sufficient new air being taken in at intervals to compensate for any loss through leakage.

The circulating conduit is connected by means of a pipe $K$ with the delivery ports of the cylinder $L$ and is connected through the pipe $K'$ with the intake ports of the cylinder. The intake ports of the cylinder are controlled by a valve connected with the valve rod $M$ which is operated to alternately open and close the ports, each port remaining open during the entire intaking stroke of the piston. The delivery ports of the cylinder are controlled by a main valve N and a release valve N' similar to the main and release valves already described. The intake valve and main delivery valve are shifted at each end of the stroke of the piston by means of arms L' connected with the piston rod and arranged to engage collars L² on the valve rods. The release valve N' is operated and controlled from an eccentric O secured to the operating shaft P and regulated and controlled through a mechanism similar to the regulating and controlling mechanism already described. The hot exhaust from the motor which drives the shaft P is passed through a heating device Q arranged to heat the air as it passes through the delivery pipe K, the exhaust passing thence through a pipe Q' to the jacket of the cylinder L, thence through a pipe Q² to a heating device Q³ which supplies heat to the air passing through the return pipe K'.

In using the apparatus, the eccentric for the release valve N' is fixed in accordance with the amount of compression desired. In starting the apparatus air is drawn in from the outside atmosphere through a pipe K², the communication between the pipe K' and the cylinder being closed by a three-way valve K³. When the desired pressure has been secured in the circulating conduit, the three-way valve is operated to close the communication with the pipe K² and to open communication between the pipe K' and the intake valves of the cylinder L. Now during the operation of the apparatus the compressed air coming from the circulating conduit at a comparatively low temperature will pass through the heater K³ where it will absorb heat, will pass into the cylinder L back of the piston where it will expand and act against the piston to assist in the compression taking place in front of the piston. The air in front of the piston which was taken in on the stroke in the other direction will be compressed and the heat within the air raised to a higher temperature level. This compressed air with the heat thus raised to a higher temperature level and with the heat imparted thereto by the work done thereon in compressing it, will pass through the pipe K and as it passes through the heater Q will absorb heat from the exhaust from the prime motor and will then pass through the circulating conduit.

The governing mechanism may be controlled to maintain a constant pressure in the circulating conduit by connecting the pipe J¹¹ which leads to the casing J⁹, with the delivery pipe K, as indicated.

It will be understood that the specific construction of the compressing mechanism and of the means for utilizing the compressed air delivered from the circulating conduit and the specific construction of the various devices and mechanisms forming parts of the apparatus are not material, and that the mechanisms and devices shown in the drawings are shown merely for the purpose of illustrating diagrammatically the construction and mode of operation of the apparatus embodying the features of invention.

Without attempting to point out in detail the various forms of apparatus in which my invention may be embodied, what I claim and desire to secure by Letters Patent is:—

1. A heating apparatus comprising a fluid compressing mechanism, a circulating conduit to which the high temperature fluid from the compressing mechanism is delivered, a motor to which the compressed fluid is delivered from the circulating conduit, means for governing the compressing mechanism, and means for correspondingly governing the delivery of the fluid from the circulating conduit to the motor.

2. A heating apparatus comprising a fluid compressing mechanism, a circulating conduit to which the high temperature fluid from the compressing mechanism is delivered, a motor to which the compressed fluid is delivered from the circulating conduit, means for regulating the amount of compression, and means for regulating the delivery of the compressed fluid to the motor to conform to the action of the compressing mechanism.

3. A heating apparatus comprising a fluid compressing mechanism, a circulating conduit through which high temperature fluid from the compressing mechanism passes, means for utilizing the compressed fluid after passing through the circulating conduit for reducing the work required for operating the compressing means, means for governing the amount of compression, and means for governing the delivery of compressed air from the circulating conduit.

4. A heating apparatus comprising fluid compressing mechanism, a circulating conduit to which the high temperature fluid from the compressing mechanism is delivered, means for regulating the amount of compression, and means for regulating the delivery of compressed fluid from the circulating conduit to conform to the action of the compressing mechanism.

5. A heating apparatus comprising a fluid compressing mechanism, a circulating conduit to which the high temperature fluid from the compressing mechanism is delivered, means for governing the compressing mechanism, and means for correspondingly governing the delivery of the compressed fluid from the circulating conduit.

6. A heating apparatus comprising mechanism for compressing a fluid, a circulating conduit through which the fluid passes, means for regulating and governing the compressing mechanism, and means for correspondingly regulating and governing the delivery of compressed fluid from the circulating conduit.

In witness whereof, I have hereunto set my hand, this 3rd day of August, 1906.

GUY B. COLLIER.

In presence of—
NATHANIEL B. WALES,
IRA L. FISH.